Patented Nov. 28, 1933

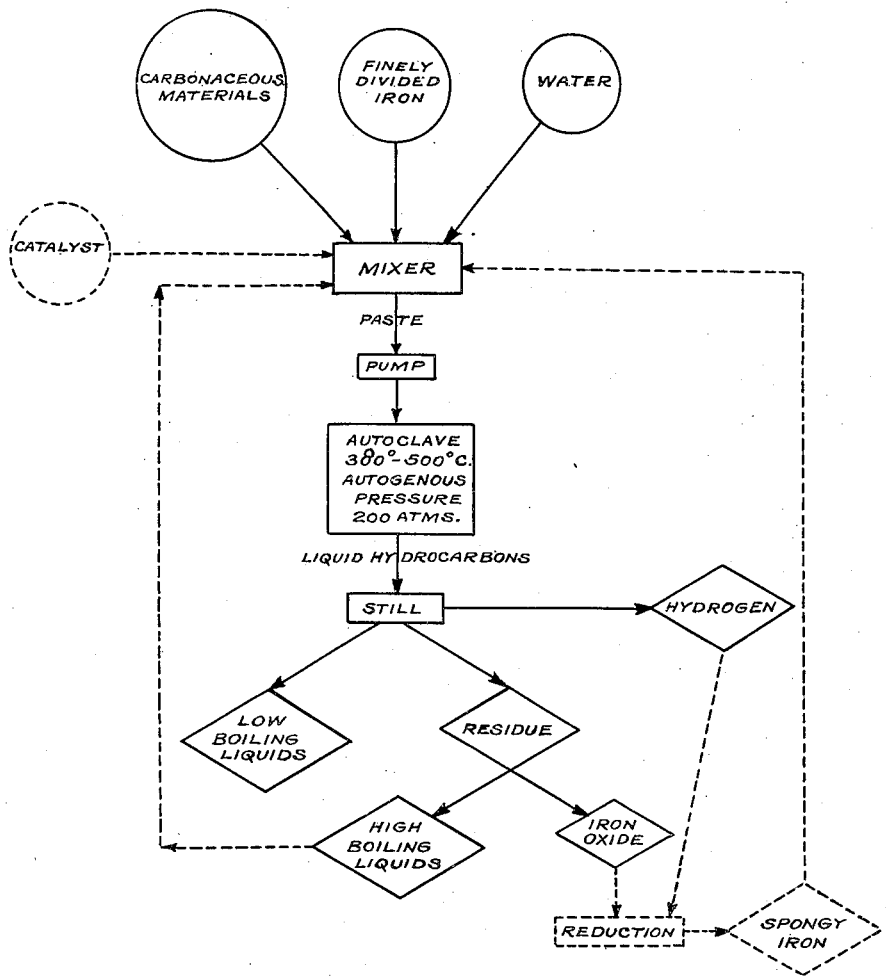

1,936,819

UNITED STATES PATENT OFFICE 1,936,819

PRODUCTION OF LIQUID PRODUCTS FROM SOLID OR LIQUID CARBONACEOUS MATERIALS

Richard Bayer, Karlsruhe, Germany, assignor to Friedrich Uhde, Dortmund, Germany Application September 21, 1929, Serial No. 394,393, and in Germany October 3, 1928. Renewed September 8, 1933

13 Claims. (Cl. 196—53)

My invention refers to the decomposition of petroleum, tar, bituminous matter of all kinds and the products of distillation of these materials with a view to the production of liquid hydrocarbons of low boiling point. It is an object of my invention to provide means whereby such decomposition and the recovery of liquid hydrocarbons of the kind specified can be effected in a simpler and more efficient manner than was hitherto possible.

Nowadays crude oil and petroleum, tar, other bituminous matter and the distillation products thereof are decomposed and converted into liquid hydrocarbons of low boiling point by causing the starting materials to react with compressed hydrogen, if desired in the presence of catalysts, at temperatures at which the constituents of the starting material begin to decompose. This mode of proceeding requires hydrogen gas of comparatively high purity which must be compressed under a pressure of 100–300 atms.

I have now found that it is possible to convert mineral oil, tar oil, bituminous matter, carbon, wood etc. into liquid products of low boiling point without the use of compressed hydrogen gas, by causing these materials to react at the temperature, where decomposition begins, in closed pressure-resistant vessels with a mixture of water and a finely divided or spongy metal capable of reacting with water to form nascent hydrogen at temperatures above 380° C. and water, this mixture being intimately mixed with the starting materials. The reaction is conducted under self-generated pressures, corresponding to the temperatures employed in the reaction. As spongy metal I prefer using finely divided iron which I usually prepare by the reduction of iron oxide.

A mixture of iron and water on being heated is known to react according to the equation:

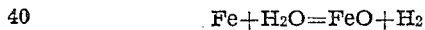
$$Fe + H_2O = FeO + H_2$$

In this reaction elementary nascent hydrogen is formed, which is known to be particularly active. In consequence of its nascent state this hydrogen will readily and quickly combine with the carbonaceous compounds in the mixture at lower temperatures than those at which this would otherwise be possible. The iron oxide resulting in the reaction, after having been separated from the reaction product proper, can be reduced to spongy iron in a well known manner by means of reducing gases or other reducing agents, for instance carbon, and can be returned into the process.

The method above described offers quite a number of important advantages. No pure hydrogen need be manufactured and no compression of the hydrogen is necessary so that the power hitherto required for compression is saved altogether. The nascent hydrogen available reacts more readily than ordinary hydrogen gas. In contradistinction to hydrogen gas the mixture of iron and water does not effect any corrosion of the walls of the reaction vessel.

In practising my invention I finely distribute the mixture of carbonaceous compounds, spongy iron and water so as to produce an emulsion or paste, which is then forced into the reaction vessel by means of a pump. This shows that the apparatus required in the practice of this process is of a very simple kind so that the first costs as well as the service costs are low. As compared with the well known cracking processes the process according to the present invention offers the advantage that no losses occasioned by the formation of coke arise and that scarcely any gaseous hydrocarbons are formed, so that the yield of hydrocarbons of low boiling point is considerably higher.

The succession of steps employed in my process is illustrated diagrammatically in the accompanying drawing which represents a flow sheet of my process. As shown, carbonaceous materials, water and finely divided iron are introduced into a mixer. A catalyst may also be added. These ingredients are mixed to form an emulsion or paste and then introduced into an autoclave. In this device the paste is heated to temperatures of from 380° to 500° C. and under autogenous pressures of 200 atmospheres or above. The liquid residue is then usually run into a still for separation and recovery of the low boiling constituents. The iron oxide formed during the reaction is separated from the high boiling residue which may then be returned for a repetition of the process. The iron oxide may be reduced by hydrogen derived from the process and the spongy iron thus formed recycled to the mixing step to be used in a repetition of the process.

*Example 1.*—3 parts by weight brown coal tar, 2 parts spongy iron and 1 part water are intimately mixed and the mixture is heated under continuous agitation in a pressure-resistive vessel to 400–500° C., the pressure rising above 200 atms. The product of reaction is separated from the water and subjected to distillation. About 60–80% of the starting materials are recovered in the form of liquid hydrocarbons boiling below 200° C., while the rest, boiling above 200° C., can either be used as motor oil or heating oil or can be returned into the process. The resulting gas, which mainly consists of hydrogen, can be used for reducing the iron oxide formed in the reaction, after the low boiling hydrocarbons admixed to it have been separated out. This process is adapted as well for the treatment of low grade brown coal producer tars containing a high percentage of water, as of brown coal tar distillation products.

*Example 2.*—3 parts of a crude oil (crude petroleum) freed from readily volatile constituents are heated in an autoclave with 1 part spongy iron and 1 part water to 400–470° C., the pressure rising to 200 atms. The product of reaction is subjected to distillation in a well known manner. Besides a corresponding quantity of gases, mainly consisting of hydrogen, about 60–80% of a starting material are converted into a fraction boiling below 200° C. and having an agreeable odor, while 10–20% distil over between 300 and 360° C., the rest forming a viscous oil having valuable lubricating properties. Here also the middle and higher fractions can be returned into the process so that almost the whole starting material is converted into products of low boiling points.

*Example 3.*—Bituminous pit coal or brown coal in finely ground condition is mixed with an oil of high boiling point, preferably an oil obtained in the course of the process. 2 parts of this mixture are heated in an autoclave under continuous stirring with 1 part spongy iron and 1 part water to 400–470° C. The carbon is recovered almost completely in liquid form, 20–30% of a fraction boiling below 200° and 15–20% boiling between 200 and 300° being obtained. The products boiling above 200° C. contain as a rule some phenol. The fraction having the highest boiling point contains a viscous oil of favorable lubricating properties.

The oil serving as a distributing medium for the coal can also be replaced by water. In this case I prefer adding a salt capable of diminishing the steam tension, for instance alkaline compounds such as soda, potash or the like.

Instead of coal also the coal tars and their fractions, such as crude naphthalene and crude anthracene can be converted into valuable liquid products.

*Example 4.*—4 parts wood meal are heated in a closed vessel together with 2 parts spongy iron, 3 parts water and 0.5 parts soda to about 380° C., the pressure rising to about 200 atms. Apart from a greater quantity of gas containing more than 80% hydrogen, some carbon dioxide and methane, a little more than 20% are obtained in the form of neutral oils, while 5–8% have an acid character. The watery layer further contains about 2–3% methanol, some acetone and aldehydes and 5–10% water soluble acid, mainly formic and acetic acid.

Instead of wood also peat or other cellulosic vegetable matter capable of being liquefied during the process can be used. The wood or the like may also be mixed with the oil recovered in the process. This oil may be further subjected to a repeated treatment at higher temperature in order to produce readily volatile hydrocarbons.

In order to accelerate the reaction I have found it advantageous to add to the reaction mixture substances capable of exerting a hydrogenating effect, for instance nickel oxide, copper oxide, zinc oxide, zinc chromate etc. I may further add substances which simultaneously act as cracking or polymerizing agents, for instance zinc chloride, aluminium hydrate etc. I may also add to the mixture substances capable of increasing the velocity of the reaction between iron and water, for instance metallic copper or tin or various oxides such as zinc oxide.

Obviously instead of mixing the starting materials in the proportions above specified, other proportions may be chosen. The quantity of iron and water required can be greatly reduced by increasing the reaction temperature. I may also influence the pressure by varying the quantity of water used in the reaction.

The reaction products obtained in the process mostly possess an agreeable aromatic odor.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

I claim:—

1. A process for converting carbonaceous materials into lower boiling hydrocarbon oils which comprises introducing such a material, finely divided iron and liquid water into a closed reaction zone, the proportions of the iron and water being such as to react at elevated temperature with the liberation of sufficient hydrogen to hydrogenate a substantial portion of the carbonaceous material during its conversion into lower boiling oils; subjecting the mixture of carbonaceous material, iron and water in the closed reaction zone to a temperature of at least about 380° C. thereby liberating hydrogen from the water and building up within the reaction zone a self-generated pressure adequate for the hydrogenation and sufficient to prevent substantial vaporization of the carbonaceous material; and retaining the mixture under said elevated temperature and pressure in the reaction zone for a sufficient time to produce said lower boiling oils by reaction between the liberated hydrogen and the carbonaceous material.

2. A process for converting carbonaceous materials into lower boiling hydrocarbon oils which comprises introducing such a material, finely divided iron and liquid water into a closed reaction zone, the proportions of the iron and water being such as to react at elevated temperature with the liberation of sufficient hydrogen to hydrogenate a substantial portion of the carbonaceous material during its conversion into lower boiling oils; subjecting the mixture of carbonaceous material, iron and water in the closed reaction zone to a temperature of from about 380° to 500° C. and sufficient to build up within the reaction zone a self-generated pressure of at least about 200 atmospheres; and retaining the mixture under the elevated temperature and pressure in the reaction zone for a sufficient time to produce said lower boiling oils by reaction between the liberated hydrogen and carbonaceous material.

3. The process of claim 1 followed by reduction of the iron oxide formed in the process, by excess hydrogen also formed in the process, and the recycling of the spongy iron thus produced in a repetition of the process.

4. The process of claim 1 wherein an alkaline material is added to the mixture within the closed reaction zone.

5. The process of claim 1 wherein there is also present in the reaction zone a metal such as copper and tin capable of increasing the velocity of the reaction.

6. The process of claim 1 followed by recovery of an oil from the reaction and treatment of said oil in a repetition of the process.

7. The process of claim 1 wherein a hydrogenation catalyst such as nickel oxide, copper oxide, zinc oxide and zinc chromate is also present in the reaction zone.

8. A process for converting carbonaceous materials into lower boiling hydrocarbon oils which comprises introducing such a material, liquid water and a finely divided metal capable of reacting with water to produce nascent hydrogen at temperatures above 380° C., into a closed reaction zone, heating the resulting mixture in said zone to temperatures of at least about 380° C. thereby generating nascent hydrogen by reaction of said metal with said water and building up within said reaction zone a self-generated pressure adequate to produce hydrogenation of said carbonaceous material and sufficient to prevent substantial vaporization of said carbonaceous material, and retaining said mixture under said elevated temperature and pressure until said lower boiling oils are produced and hydrogenated by reaction between the liberated hydrogen and the carbonaceous material; the amount of finely divided metal and of water added to said reaction zone being such as to produce sufficient hydrogen to hydrogenate a substantial portion of the carbonaceous material during its conversion into lower boiling oils.

9. The process of claim 8 wherein the temperatures employed range from about 380° to 500° C. and the pressures reached are of the order of at least about 200 atmospheres.

10. The process of claim 8 followed by recovery of an oil from the reaction and treatment of said oil in a repetition of the process.

11. The process of claim 8 wherein an alkaline material is added to the mixture within the closed reaction zone.

12. The process of claim 8 wherein there is also present in the reaction zone a metal such as copper and tin capable of increasing the velocity of the reaction.

13. The process of claim 8 wherein a hydrogenation catalyst such as nickel oxide, copper oxide, zinc oxide and zinc chromate is also present in the reaction zone.

RICHARD BAYER.